United States Patent
Grondalski (10) Patent No.: US 11,775,753 B1
(45) Date of Patent: Oct. 3, 2023

(54) METHOD FOR CONVERTING PARSER DETERMINED SENTENCE PARTS TO COMPUTER UNDERSTANDING STATE MACHINE STATES THAT UNDERSTAND THE SENTENCE IN CONNECTION WITH A COMPUTER UNDERSTANDING STATE MACHINE

(71) Applicant: Robert Stanley Grondalski, Allen, TX (US)

(72) Inventor: Robert Stanley Grondalski, Allen, TX (US)

( * ) Notice: Subject to any disclaimer, the term of this patent is extended or adjusted under 35 U.S.C. 154(b) by 334 days.

(21) Appl. No.: 17/378,548

(22) Filed: Jul. 16, 2021

Related U.S. Application Data (60) Provisional application No. 63/170,969, filed on Apr. 5, 2021.

(51) Int. Cl.
  *G06F 40/205* (2020.01)
  *G06N 20/00* (2019.01)

(52) U.S. Cl.
  CPC ........... *G06F 40/205* (2020.01); *G06N 20/00* (2019.01)

(58) Field of Classification Search
  CPC .............................. G06F 40/205; G06N 20/00
  See application file for complete search history.

(56) References Cited

U.S. PATENT DOCUMENTS

| | | | |
|---|---|---|---|
| 7,370,042 B2 * | 5/2008 | Grondalski | G06N 20/00 |
| 9,336,297 B2 * | 5/2016 | Galitsky | G06F 16/3344 |
| 10,467,341 B1 * | 11/2019 | Abad | G06Q 10/06316 |
| 11,379,446 B1 * | 7/2022 | Detmer | G06F 16/24552 |
| 11,609,893 B1 * | 3/2023 | Anderson | G06F 16/2246 |
| 11,704,486 B2 * | 7/2023 | Wu | G06N 3/045 |
| | | | 704/9 |
| 2010/0024030 A1 * | 1/2010 | Meijer | G06F 16/90344 |
| | | | 707/E17.005 |
| 2011/0307435 A1 * | 12/2011 | Overell | G06F 16/367 |
| | | | 706/46 |
| 2016/0188570 A1 * | 6/2016 | Lobez Comeras | G06F 40/211 |
| | | | 704/9 |
| 2016/0246779 A1 * | 8/2016 | Ho | G06F 40/30 |
| 2018/0247549 A1 * | 8/2018 | Martin | G09B 19/00 |
| 2018/0307584 A1 * | 10/2018 | Smith | G06F 8/427 |
| 2021/0168021 A1 * | 6/2021 | Wang | H04L 41/0627 |
| 2022/0035799 A1 * | 2/2022 | Bhutada | G06F 40/30 |

(Continued)

OTHER PUBLICATIONS

Introduction to Switching Theory and Logical Design by Frederick J. Hill and Gerald R. Peterson, published by John Wiley and Sons, 1968.

(Continued)

*Primary Examiner* — Anne L Thomas-Homescu
(74) *Attorney, Agent, or Firm* — Plager Schack LLP; Mark H. Plager; Stephen Hallberg (57) ABSTRACT

A method for processing natural language sentences and a computer understanding state machine with computer understanding state machine states are disclosed. The computer understanding state machine receives as inputs the parsed sentence including abstractions of the parsed sentence including weights of the abstractions. These inputs are used to find the best fitting state to process the input sentence. Subsequent sentences also are parsed and these are input to the state machine to allow processing of sequences of sentences.

2 Claims, 6 Drawing Sheets

---

500

SUBJECT/BILL WEIGHT 9
SUBJECT/MALE_PERSON WEIGHT 8
SUBJECT/PERSON WEIGHT 7
SUBJECT/MAMMAL WEIGHT 6
SUBJECT/LIVING_THING WEIGHT 5
SUBJECT/THING WEIGHT 4

VERB/GO WEIGHT 9

OBJECT/HOME WEIGHT 9
OBJECT/BUILDIING WEIGHT 8
OBJECT/THING WEIGHT 7

COMPUTER UNDERSTANDING STATE "PERSON GO HOME"/SUBJECT/PERSON WEIGHT=7
/VERB/GO WEIGHT=9
/OBJECT/HOME WEIGHT=9
TOTAL WEIGHT FOR COMPUTER UNDERSTANDING STATE "PERSON GO HOME" = 7+9+9=25

(56) References Cited

U.S. PATENT DOCUMENTS

| | | | |
|---|---|---|---|
| 2022/0083732 A1* | 3/2022 | Lo | G06F 40/205 |
| 2022/0100968 A1* | 3/2022 | Chiari | G06F 40/30 |
| 2022/0198116 A1* | 6/2022 | Zhang | G06F 30/392 |
| 2022/0284190 A1* | 9/2022 | Alonichau | G06F 40/30 |
| 2022/0308918 A1* | 9/2022 | Pandey | G06N 5/043 |
| 2022/0318713 A1* | 10/2022 | Bialy | G06Q 10/06316 |
| 2023/0215206 A1* | 7/2023 | Thibodeaux | G06V 30/153 |
| | | | 382/180 |

OTHER PUBLICATIONS

Augmented Transition Networks for Natural Language Analysis by W.A. Woods. Sponsored by National Science Foundation, Washington, DC. Authoring Institution: Harvard Univ., Cambridge, MA. Aiken Computation Lab. Harvard University Computation Lab, Report CS-1, Dec. 1969.

Retrieval Time from Semantic Memory by Allan M Collins, M. Ross Quillian from Journal of Verbal Learning and Verbal Behavior, vol. 8, pp. 240-247, published 1969.

* cited by examiner

| CURRENT STATE | INPUTS | NEXT STATE |
| STATE1 | PUSH_DOWN | STATE3 |
| STATE1 | PREVIOUS | STATE2 |
| STATE3 | RETURN2 | STATE2 |
| STATE3 | RETURN1 | STATE1 |
| STATE1 | PREVIOUS | STATE4 |

```
BILL -> MALE_PERSON -> PERSON -> MAMMAL -> LIVING_THING -> THING

SUBJECT/BILL WEIGHT 9
SUBJECT/MALE_PERSON WEIGHT 8
SUBJECT/PERSON WEIGHT 7
SUBJECT/MAMMAL WEIGHT 6
SUBJECT/LIVING_THING WEIGHT 5
SUBJECT/THING WEIGHT 4
```

```
SUBJECT/BILL WEIGHT 9
SUBJECT/MALE_PERSON WEIGHT 8
SUBJECT/PERSON WEIGHT 7
SUBJECT/MAMMAL WEIGHT 6
SUBJECT/LIVING_THING WEIGHT 5
SUBJECT/THING WEIGHT 4

VERB/GO WEIGHT 9

OBJECT/HOME WEIGHT 9
OBJECT/BUILDIING WEIGHT 8
OBJECT/THING WEIGHT 7

COMPUTER UNDERSTANDING STATE "PERSON GO HOME"/SUBJECT/PERSON WEIGHT=7
                        /VERB/GO WEIGHT=9
                        /OBJECT/HOME WEIGHT=9
  TOTAL WEIGHT FOR COMPUTER UNDERSTANDING STATE "PERSON GO HOME" =
                        7+9+9=25
```

METHOD FOR CONVERTING PARSER DETERMINED SENTENCE PARTS TO COMPUTER UNDERSTANDING STATE MACHINE STATES THAT UNDERSTAND THE SENTENCE IN CONNECTION WITH A COMPUTER UNDERSTANDING STATE MACHINE

This application claims benefit to U.S. Provisional Patent Application 63/170,969, entitled "A METHOD FOR CONVERTING PARSER DETERMINED SENTENCE PARTS TO COMPUTER UNDERSTANDING STATE MACHINE STATES THAT UNDERSTAND THE SENTENCE IN CONNECTION WITH A COMPUTER UNDERSTANDING STATE MACHINE," filed Apr. 5, 2021. The U.S. Provisional Patent Application 63/170,969 is incorporated herein by reference.

BACKGROUND

Embodiments of the invention described in this specification relate generally to digital data processing systems, and more particularly, to natural language processing, artificial intelligence, a method for converting parser determined sentence parts to computer understanding state machine states that understand the sentence, and a computer understanding state machine with computer understanding state machine states.

A digital data processing system used for natural language processing (NLP) uses a mechanism called a parser to convert the words of a sentence to its sentence parts. Common sentence parts are subject, verb, and object. For example, the sentence "Bill goes home." has the sentence parts of subject=Bill, verb=go, and object=home. Most parsers use a state machine described by Woods to convert the words of a sentence to its sentence parts (hereinafter referred to as the "Woods sentence parsing method", the "Woods hierarchical sentence parsing method", "Woods state machine", and/or the "Woods parser"). To parse a single word, Woods uses an abstraction of a word to its word type. For example, "Bill" is word type noun. Also, abstraction of word categories is described in Collins and Quillian.

A state machine is a computer mechanism that receives a sequence of inputs and generates outputs based on the sequence of inputs. State machines are used extensively in the field of computer design, described in Hill and Peterson. A movement from state to state is called a transition. Some existing types of state machines include simple state machines and hierarchically nested state machines (HSM) described in Drusinsky.

State machines may be implemented in software or hardware. In software, a computer program uses variables to store the states of a state machine. These variables are stored in the memory of the computer and the transition from state to state is controlled by the program in the memory of the computer. In hardware, the states of a state machine are implemented using hardware storage elements such as latches and flip flops. A clock transitions the hardware state machine from state to state.

The work of Woods describes how a hierarchical state machine parser converts the words of a sentence into its sentence parts. A sequence of words is input to the Woods state machine. The first important feature of the Woods state machine is finding the type of word that is being input such as noun, verb, adjective, article, and so on. The second important feature of the Woods state machine is to use this word type information to cause the state machine to transition from state to state. The Woods state machine receives as inputs a sequence word types corresponding to the words of a sentence and outputs the sentence parts of the sentence (e.g., nouns, verbs, etc.)

However, understanding the parsed sentence has been a problem in NLP. First there is a problem of a computer understanding a single sentence. For example, the problem of a computer understanding the sentence "Bill is hungry." Then there is a problem of a computer understanding a sequence of sentences. For example, if the first sentence in a sequence of sentences is "Bill is hungry." and the second sentence is "Bill eats food", there is a problem of the computer understanding the relationship between the two sentences. With a sequence of many sentences, there is a problem of the computer understanding a sequence of many sentences.

Therefore, what is needed is a way to define state machines that understand sentences and sequences of sentences.

BRIEF DESCRIPTION

A method for converting parser determined sentence parts to novel computer understanding state machine states of a novel computer understanding state machine is disclosed in which the computer understanding state machine states understand single sentences and sequences of sentences. In some embodiments, the method for converting parser determined sentence parts to computer understanding state machine states of a computer understanding state machine is used in natural language processing and natural language sentence processing. In some embodiments, the method for converting parser determined sentence parts to computer understanding state machine states of a computer understanding state machine utilizes a modification of the Woods sentence parsing method to understand single sentences and sequences of sentences by converting sentence parts to computer understanding state machine states that understand the sentence (or each sentence in a sequence).

In some embodiments, the method for converting parser determined sentence parts to computer understanding state machine states of a computer understanding state machine to understand single sentences uses an abstraction of word categories to activate abstract computer data states. In some embodiments, the method for converting parser determined sentence parts to computer understanding state machine states of a computer understanding state machine abstracts all of the parsed words of a single sentence in an abstraction hierarchy (full abstraction path) to select an abstract computer data state that is a defined computer understanding state machine state of a computer understanding state machine and then causes the defined computer understanding state machine state to transition according to the computer understanding state machine. In some embodiments, the selected computer understanding state machine states understand the sentence and the state to state movement (transaction) between the various defined computer understanding state machine states of the computer understanding state machine understands a sequence of sentences. In some embodiments, the method for converting parser determined sentence parts to computer understanding state machine states of a computer understanding state machine to understand a single sentences and sequences of sentences uses the full abstraction path of the sentence words to understand a sentence. In some embodiments, to understand sequences of sentences, the method for converting parser determined sentence parts to computer understanding state machine states of the computer understanding state machine uses a modification of the state movement of the Woods sentence parsing method.

In some embodiments, the method for converting parser determined sentence parts to computer understanding state machine states of a computer understanding state machine to understand single sentences and sequences of sentences is performed in connection with a method for processing natural language sentences. In some embodiments, the method for processing natural language sentences comprises (i) receiving parsed sentence parts and levels of abstractions of the parsed sentence parts with weights of the abstractions that decrease with each level of abstraction as input into a computer understanding state machine, (ii) finding a best fitting computer understanding state machine state for the received input in the computer understanding state machine, and (iii) activating the best fitting computer understanding state machine state when all computer understanding state machine state list inputs match the parsed sentence parts input to the computer understanding state machine. In some embodiments, the method for processing natural language sentences further comprises processing a sequence of sentences by transition of states associated with the sentence parts of each sentence in the sequence and previous states of the computer understanding state machine.

These and other aspects are better appreciated and understood when considered in conjunction with the following description and the accompanying drawings. It should be understood that the following description, while indicating various embodiments of the computer understanding state machine and the computer understanding state machine states and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

Having thus described the invention in general terms, reference is now made to the accompanying drawings, which are not necessarily drawn to scale, and which show different views of different exemplary, non-limiting embodiments.

DETAILED DESCRIPTION

In the following detailed description of the invention, numerous details, examples, and embodiments of the computer understanding state machine, the computer understanding state machine states of the computer understanding state machine, and the method for converting parser determined sentence parts to computer understanding state machine states of a computer understanding state machine are described. However, it will be clear and apparent to one skilled in the art that the invention is not limited to the embodiments and examples set forth and that the invention can be adapted for any of several applications.

Some embodiments of the invention include a novel method for converting parser determined sentence parts to computer understanding state machine states of a computer understanding state machine. In some embodiments, the method for converting parser determined sentence parts to computer understanding state machine states of a computer understanding state machine is used in natural language processing and natural language sentence processing. In some embodiments, the method for converting parser determined sentence parts to computer understanding state machine states of a computer understanding state machine utilizes a modification of the Woods sentence parsing method to understand single sentences and sequences of sentences. Specifically, the method for converting parser determined sentence parts to computer understanding state machine states of a computer understanding state machine converts sentence parts (such as "noun", "verb", "object", etc., as converted by a Woods parser from words of a sentence) to state machine states that understand the sentence.

In the context of this specification, the concept of "understanding a sentence" means creating data links related to the sentence. For example, the sentence "Bill goes home" is understood by creating the data link Bill/location/home where Bill is the source node, location is the relation, and home is the destination. This data link can be used later to answer the question "Where is Bill?" The method of the present disclosure demonstrates how the words of a sentence activate computer understanding state machine states in a computer understanding state machine that create data links based on understanding the sentence and how sequences of these computer understanding state machine states understand sequences of sentences.

As stated above, a state machine is a computer mechanism that receives a sequence of inputs and generates outputs based on the sequence of inputs. State machines are used extensively in the field of computer design, and have been designed in connection with NLP to improve the understanding of meaning expressed in statements of multiple sentences and sequences of sentences. However, understanding parsed sentences has been a problem in NLP in understanding a single sentence, a sequence of sentences, and a sequence of many sentences.

Figure 1:
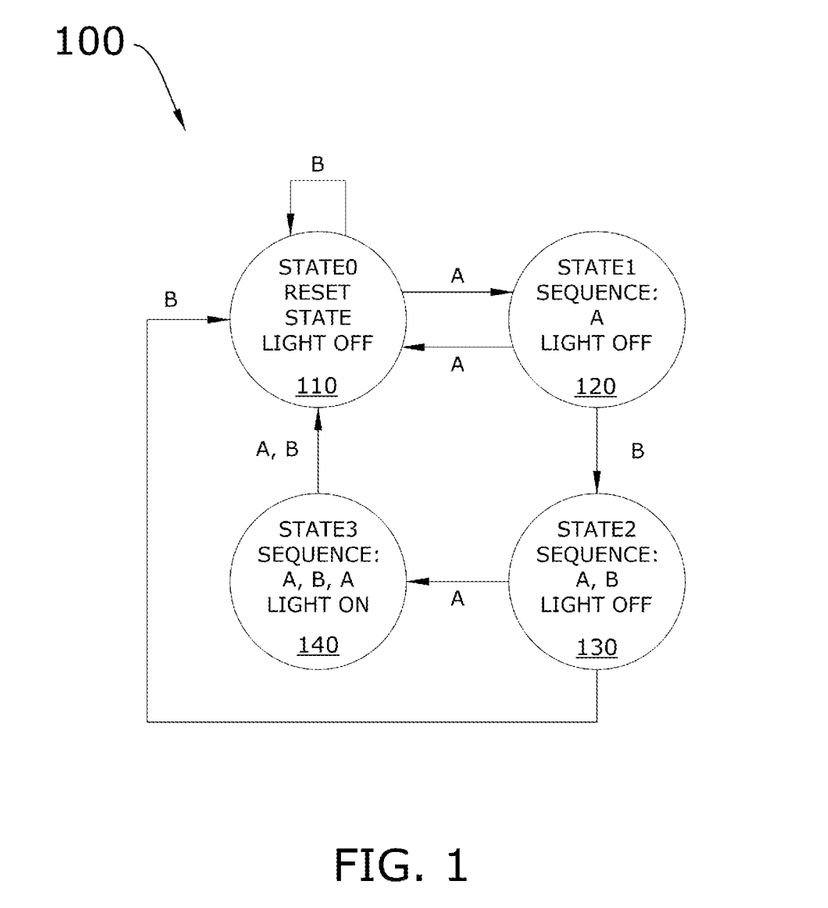
FIG. 1 demonstrates an existing simple state machine.

By way of example, FIG. 1 demonstrates an example of a simple state machine 100. In keeping with tradition regarding the visual representation of a state, each circle represents a state machine state. The connections between the states are shown as lines with arrows. A state machine always has one state active. In other words, imagine one of the circles in this figure being active. A state machine moves from state to state based on two things. First, the current state that is active, and second, the input data. A movement from state to state is called a transition. The simple state machine 100 shown in this figure has three inputs named A, B, and RESET, and four states, namely, a RESET state 110 (also referred to as "state 0"), a first input sequence state 120 (also referred to as "state 1"), a second input sequence state 130 (also referred to as "state 2"), and a third input sequence state 140 (also referred to as "state 3").

As noted, the example state machine 100 shown in FIG. 1 has four states 110-140 and has three inputs named A, B, and RESET. The example state machine 100 also has an output that lights a light bulb if the sequence of inputs A, B, A occurs after a RESET. Any input after the sequence A, B, A returns to the RESET state. Only one input can occur at one time. A reset starts the simple state machine 100 at the RESET state 110, or "state 0".

When the simple state machine 100 shown in this figure is in the RESET state 110, with "state 0" active, if the input "A" is made (e.g., an "A" button is pressed, an "A" input is received by a computing device via user input, etc.), a transition from the RESET state 110 to the first input sequence state 120 occurs, such that "state 0" deactivates and "state 1" activates. In other words, "state 1" activates when the previous state ("state 0") is active and the input "A" occurs. At this point, the sequence of inputs is just "A", so the light remains off. If input "A" is made again (e.g., "A" button is pressed again, "A" input is received again, etc.), the simple state machine 100 returns to the RESET state 110, back at "state 0". Returning to the RESET state 110 causes the sequence of inputs to be cleared, which effectively puts the simple state machine 100 back to the initial state with no existing inputs. However, when "state 1" is active at the first input sequence state 120 and the input "B" is received (e.g., the "B" button is pressed, the input "B" is received by user input, etc.), then "state 1" deactivates at the first input sequence state 120 and "state 2" activates at the second input sequence state 130. At this point, the sequence of inputs would be A, B. Now at the second input sequence state 130, if the "A" input is provided (e.g., "A" button is pressed again, "A" input is received again, etc.), then "state 2" deactivates at the second input sequence state 130 and "state 3" activates at the third input sequence state 140, which turns the light on. Specifically, this sequence of inputs A, B, A results in transitions that result in activation of "state 3" at the third input sequence state 140, which has an action to turn the light on.

Figure 2:
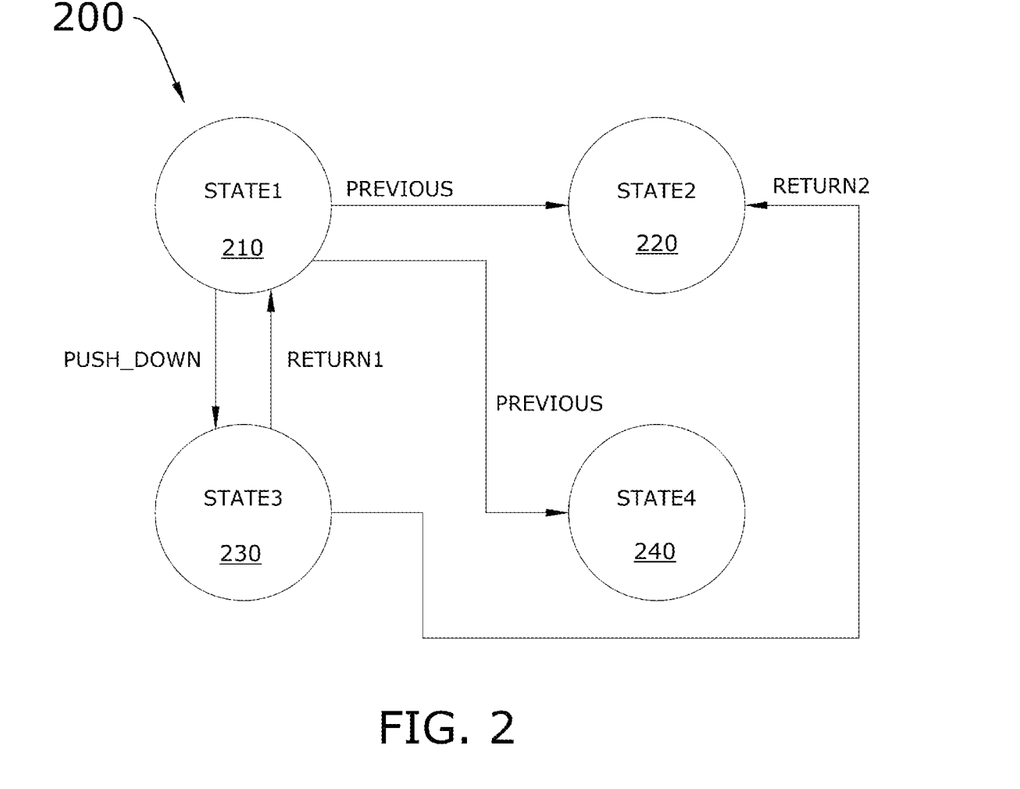
FIG. 2 demonstrates an existing hierarchical state machine (HSM).

Now turning to another prior art example of a state machine, FIG. 2 is a diagram of a hierarchical state machine 200 (also referred to as "HSM machine"), which is described in Drusinsky. This type of state machine allows pushing down to a state or sequence of states and later returning to the calling state (or rather, most recent calling state). This allows reusing a sequence of states like a subroutine is reused when called from different parts of a computer program.

As shown in this figure, the example hierarchical state machine 200 has four states, namely, a first state 210 (also referred to as "State 1"), a second state 220 (also referred to as "State 2"), a third state 230 (also referred to as "State 3"), and a fourth state 240 (also referred to as "State 4"), a plurality of inputs that trigger transitions from one state to another state. Specifically, the plurality of inputs for the example hierarchical state machine 200 include "push_down", "return1", and "return2". The "previous" indicator in this figure signifies that the previous state is active. While the example hierarchical state machine 200 is conceptually illustrated in this figure, reference is also made to FIG. 3, which shows a tabular listing of links 300 corresponding to the links in the hierarchical state machine 200 of FIG. 2.

Figure 3:
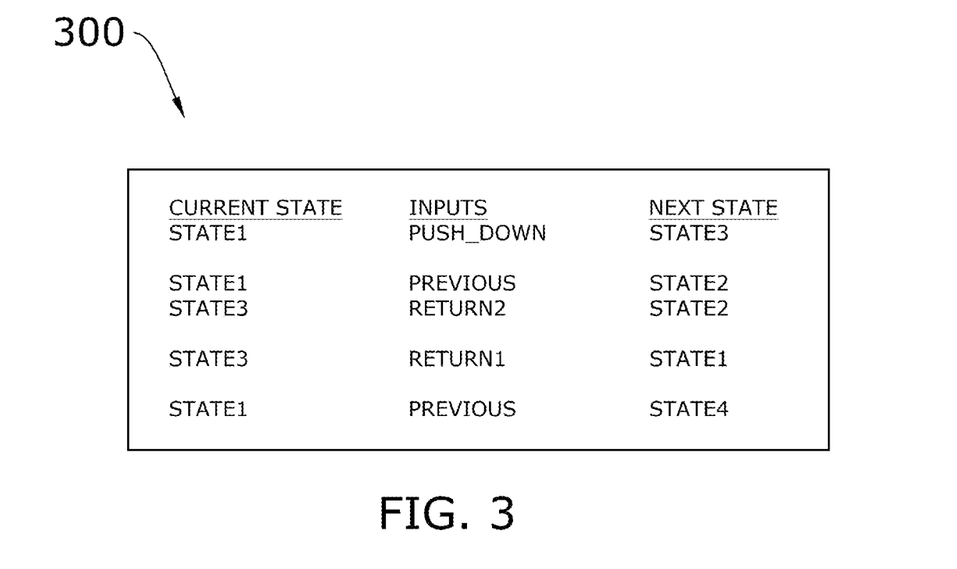
FIG. 3 shows a tabular listing of links in the HSM of FIG. 2.

Starting at the first state 210 with "State 1" active, at transition to the third state 230 will occur and "State 3" will next activate if and when it is called with the correct inputs corresponding to activation of "State 3" at the third state 230. When "State 3" completes at the third state 230, then a transition is made from the third state 230 back to the most recent calling state, which was the first state 210. In this case, "State 3" returns to "State 1" with "return1" link from "State 3" at the third state 230 to "State 1" at the first state 210, which then transitions to the second state 220 and "State 2" activates with the "return2" link from "State 3" at the third state 230 to "State 2" at the second state 220 and with the "previous" indicator from "State 1" at the first state 210 to "State 2" at the second state 220 signifying that the previous state is active (the most recent calling state defined by the most recent state with "push_down" and "State 3"). Other states (not shown) can push down to "State 3" at the third state 230. When "State 3" at the third state 230 is complete, it returns to the most recent state that pushed down to "State 3" at the third state 230. This is described in more detail below, by reference to FIG. 6. This two-step return process is similar to a computer program returning from a subroutine where the first step is to return to the subroutine calling instruction and the second step is to move to the next instruction in the program. The example in the next paragraph demonstrates an example of HSM operation via the hierarchical state machine 200.

Consider going to the movies and buying a ticket. The same "buying a ticket" sequence is used for buying a ticket in many situations, such as at the movies, at an amusement park, at a train station, or at an airport. In this example, "State 1" at the first state 210 of the hierarchical state machine 200, would be "person goes to the movies", which activates when the sentence "Bill goes to the movies." is input. Upon input of the sentence "Bill buys a ticket", at transition from the first state 210 to the third state 230 occurs with "State 1" moving to "State 3", which is the transition whenever anyone buys a ticket (person buys ticket, in this case with "Bill buys a ticket" as the input). However, "person buys a ticket" is not limited to situations in which a person buys only movie tickets, but applies to countless situations in which a person can buy a ticket. In other words, there are many links from other states not shown to "State 3", such as "person goes to amusement park" followed by "person buys ticket for amusement park", or "person goes to the airport" followed by "person buys airplane ticket". Due to the voluminous examples that are possible, these exemplary links are not explicitly demonstrated in the hierarchical state machine 200 of FIG. 2 for ease of explanation. Nevertheless, the logic is evident to understand that when the person (or "Bill") is done buying a ticket at the movies, "State 3" returns to "State 1", via transition from the third state 230 to the first state 210, then "State 1" at the first state 210 transitions to "State 2" at the second state 220 with the "return2" link from "State 3" at the third state 230 to "State 2" at the second state 220 and with the "previous" indicator from "State 1" at the first state 210 to "State 2" at the second state 220 signifying that the previous state is active, to continue going to the movies. Now, the "State 2" value could be "enter theater" since that the ticket has been purchased (or, if "State 1" input was "Josie goes to the airport" then "State 2" could be "board the plane").

State machines may be implemented in software or hardware. In software, a computer program uses variables to store the states of a state machine. These variables are stored in the memory of the computer and the transition from state to state is controlled by the program in the memory of the computer. In hardware, the states of a state machine are implemented using hardware storage elements such as latches and flip flops. A clock transitions the hardware state machine from state to state.

The work of Woods describes how a hierarchical state machine parser converts the words of a sentence into its sentence parts. A sequence of words is input to the Woods state machine. The first important feature of the Woods state machine is finding the type of word that is being input such as noun, verb, adjective, article, and so on. The second important feature of the Woods state machine is to use this word type information to cause the state machine to transition from state to state. The Woods state machine receives as inputs a sequence of word types corresponding to the words of a sentence and outputs the sentence parts of the sentence. For example, the sentence, "Bill goes home," converts the sequence of words to word types and inputs these to the Woods state machine. The word type of the word "Bill" is a noun. The word type of the word "goes" is a verb. The word type of the word "home" is a noun. Therefore, the sequence of word types "noun", "verb", "noun" is input to the Woods state machine. The Woods state machine starts at a first sentence state ("State 1") and the first input in the sequence (i.e., "noun") moves the Woods state machine to a specific state for the "noun" input (i.e., a state for "noun phrase—noun"). The next word type in the sequence provided as input to the Woods state machine is "verb", which returns to a second sentence state ("State 2") and pushes down to the state for the "verb" input (i.e., a state for "verb phrase—verb"). An example of parsing a sentence (or sequence of words) via a Woods state machine is described further below, by reference to FIG. 6.

Understanding the parsed sentence has been a problem in NLP. First, there is a problem of a computer understanding a single sentence. For example, the problem of a computer understanding the sentence "Bill is hungry." Then there is a problem of a computer understanding a sequence of sentences. For example, if the first sentence in a sequence of sentences is "Bill is hungry," and the second sentence is "Bill eats food," there is a problem of the computer understanding the relationship between the two sentences. With a sequence of many sentences, there is a problem of the computer understanding a sequence of many sentences.

Additionally, as noted above, abstraction of word categories is described in Collins and Quillian. For example, "Bill" is converted to category "male person". Additionally, the category is converted to more abstract categories. For example, "male person" is converted to "person", next "person" is converted to "mammal", and "mammal" is converted to "living thing", and so on. All of the parsed words of the sentence are abstracted in this way to select an abstract computer data state which is in an improved state machine and cause it to transition. The selected state understands the sentence and the state to state movement understands a sequence of sentences.

Embodiments of the computer understanding state machine, the computer understanding state machine states, and the method for converting parser determined sentence parts to state machine states to understand single sentences and sequences of sentences described in this specification solve such problems by using an abstraction of word categories to activate abstract computer data states. In some embodiments, the method for converting parser determined sentence parts to state machine states to understand single sentences uses an abstraction of word categories to activate abstract computer data states. In some embodiments, the method for converting parser determined sentence parts to state machine states to understand single sentences abstracts all of the parsed words of the sentence in an abstraction hierarchy (full abstraction path) to select an abstract computer data state that is a particular state (a computer understanding state machine state) in the computer understanding state machine and then causes the computer understanding state machine state to transition. In some embodiments, the selected computer understanding state machine state understands the sentence and the state to state movement (transaction) understands a sequence of sentences. In some embodiments, the method for converting parser determined sentence parts to state machine states to understand a single sentence uses the full abstraction path of the sentence words to understand a sentence. To understand sequences of sentences, the method for converting parser determined sentence parts to state machine states of some embodiments uses a modification state movement of the Woods sentence parsing method.

Abstraction and instantiation are methods commonly used in computer design. For example, when entering a schematic of a computer section, a gate (such as a NAND gate) is drawn. The gate uses transistors. Each transistor is an instantiation of a transistor type such an Nchannel of Pchannel transistor (for CMOS design). Each transistor instantiation is given an I #(instance number) name, such as I1, I2, I3 and so on. The gates are used throughout the design. For example, the NAND gate is used over and over wherever a NAND gate is needed. Each NAND gate has a unique instance name such as NAND1, NAND2, and so on. The NAND gate may be used to build a single bit of an adder. Then multiple single bit adder stages may be used to build a multiple bit adder. Each stage has a unique instance name (ADDER_BIT1, ADDER_BIT2 and so on). Therefore, the final adder has three levels of instantiation: transistor, gate, and adder stage. Adders are used throughout computer designs, so the same adder is often instantiated many times (ADDER1, ADDER2, and so on). The same is true when writing verilog (a hardware description language): a module for a particular piece of logic is written. This module can then be instantiated in another module and so on, each instantiation with its own name, using the mechanisms of abstraction and instantiation.

Words also have abstraction paths. The parser by Woods uses the abstraction of words to word types. For example, consider the sentence "Bill goes home." The word "Bill" abstracts to word type "noun", the word "goes" abstracts to word type "verb", and the word "home" abstracts to word type "noun".

The Woods state machine receives only one word type at a time. Again, consider the sentence "Bill goes home." The Woods state machine first receives the input "noun" when "Bill" is input. Next, the Woods state machine receives the input "verb" when the word "goes" is input. Finally, the Wood state machine receives the input "noun" when the word "home" is input.

Turning back to the method for converting parser determined sentence parts to state machine states to understand single sentences and sequences of sentences described in this specification, the computer understanding state machine receives many inputs at once. With respect to the sentence "Bill goes home." In some embodiments of the method for converting parser determined sentence parts to state machine states to understand single sentences and sequences of sentences, the computer understanding state machine receives all the parser inputs at once: subject/Bill, verb/go, and object/home. In addition, the computer understanding state machine receives abstractions of all of the sentence parts, namely, subject/Bill, subject/male_person, subject/person, subject/mammal, subject/living_thing, subject/thing, verb/go, object/home, object/building, and object/thing. The method for converting parser determined sentence parts to state machine states to understand single sentences and sequences of sentences of some embodiments uses all of these inputs to find a computer understanding state machine state that matches the inputs. Furthermore, each computer understanding state machine states in the computer understanding state machine has a list of inputs that must occur for the computer understanding state machine state to activate. All items in the list must be input for the computer understanding state machine state to activate. The input list for the state "person goes home" has the inputs subject/person, verb/go, and object/home. The computer understanding state machine state "person goes home" activates because all three items in the input list are present when the input sentence is "Bill goes home." However, this is based on the assumption that this computer understanding state machine state has the highest weight. Weights and determining the highest weight of a computer understanding state machine state in a computer understanding state machine is described next. Nevertheless, it is important to note that the computer understanding state machine state "person goes home" is used to understand any person going home. An abstract computer data state is a computer state machine state with at least one input being an abstraction such as the input "Bill" abstracted to "person". This saves memory space because there is no need to store a separate state for every possible person going home. This also saves/improves runtime because there are less items to search for a match. Please note that the word "goes" is converted to "go", which is the base verb of "goes".

As noted above, weights are used by the method for converting parser determined sentence parts to state machine states to understand single sentences and sequences of sentences of the present disclosure. Furthermore, the method for converting parser determined sentence parts to state machine states to understand single sentences and sequences of sentences performs steps for determining the highest weight. Thus, the abstractions of the sentence parts also include weights. This is used to find the best fitting state. The weight decreases by one ("1") for each level of abstraction. For example, subject/Bill is weight nine ("9"), subject/male_person is weight eight ("8"), subject/person is weight seven ("7"), subject/mammal is weight six ("6"), subject/living_thing is weight five ("5"), and subject/thing is weight four ("4"). Verb/go is weight nine ("9"). Object/home is weight nine ("9"), object/building is weight eight ("8"), object/thing is weight seven ("7"). All of the weights of the inputs to the computer understanding state machine are summed and the highest total for computer understanding state machine states where all inputs match the computer understanding state machine state that is selected. Consider the computer understanding state machine states "person go home" and "person go thing". When the sentence "Bill goes home" is input, the weight of the computer understanding state machine state "person goes home" is subject/person which is weight seven ("7") as described above, verb/go is weight nine ("9") as described above, and object/home is weight nine ("9") as described above, for a total of twenty-five ("7+9+9=25"). The computer understanding state machine state "person go thing" is subject/person which is weight seven ("7"), verb/go is weight nine ("9"), and object/thing is weight seven ("7") for a total of twenty-three ("7+9+7=23"). In this way, the computer understanding state machine state "person go home" with weight twenty-five ("25") is selected over "person go thing" which has weight twenty-three ("23") because the highest weight state with all sentence part inputs and abstractions matching the input list of the computer understanding state machine state is selected. The computer understanding state machine state "person go home" has the state input list of subject/person, verb/go, and object/home. The sentence, "Bill goes home," when parsed produces these inputs and all of the state input list for "person go home" match and produces the highest weight of all states resulting in this computer understanding state machine state (person go home) being selected. When the associated action for the computer understanding state machine state "person go home" is activated, the understanding of the sentence occurs. This action learns the fact "Bill/location/home".

The computer understanding state machine state selected has associated actions which are activated when the computer understanding state machine state itself is activated. These actions are similar to the action associated with parser states that learn sentence parts, such as subject or object, when the appropriate parser states activate. For example, with the sentence "Bill goes home," the action associated with the parser state "noun" will learn the sentence part subject/Bill. With the state "person go home," the action learns that the location of Bill is home (Bill/location/home). In other words, the understanding of a sentence is the activation of the action associated with the state.

These "states" are the computer understanding state machine states in a computer understanding state machine to allow understanding sequences of sentences. For example, the sentences "Bill is hungry" and "Bill eats food" (where "Bill is hungry" is followed by "Bill eats food") can be understood via a state machine where the sentence, "Bill is hungry," activates the state "person is hungry". This state is a computer understanding state machine state in the computer understanding state machine. Just like the parser state machine moves from state to state based on the word types, the computer understanding state machine of the present disclosure moves from computer understanding state machine state to computer understanding state machine state based on the sequence of sentences. The computer understanding state machine state "person is hungry" is linked to the computer understanding state machine state "person is hungry, eats" and activates when the sentence, "Bill is hungry," is followed by the sentence "Bill eats food." Please note that the second sentence could be any food, such as "popcorn" (i.e., "Bill eats popcorn"). The word "popcorn" abstracts to food and food is used to activate the computer understanding state machine state "person is hungry, eats".

The computer understanding state machine state transitions can be hierarchical. The Woods state machine uses the same "noun" state for any noun, whether subject, object, object of a preposition, and so on. The computer understanding state machine of the present disclosure uses the same computer understanding state machine states in a similar manner. For example, the sentence, "Bill went to the movies," followed by the sentence, "Bill bought a ticket," uses the same "person buy ticket" state that is used whenever a person buys a ticket. For example, the same "person buy ticket" state activates if a person buys a ticket at the movies, or if a person buys a ticket at the airport, or if a person buys a ticket at the amusement park, or if a person buys a ticket at the train station, and so on wherever a person buys a ticket.

In addition to the computer understanding state machine states of the computer understanding state machine of some embodiments, the method for converting parser determined sentence parts to computer understanding state machine states of the computer understanding state machine of the present disclosure also involves the abstraction of the computer understanding state machine states described in connection with the computer understanding state machine of this specification. For example, the computer understanding state machine state "person run home" abstracts to "person run thing" and "person go", and "person verb" and "thing verb". All of these can be used to transition to other computer understanding state machine states, with the highest weight transition being selected.

Figure 4:
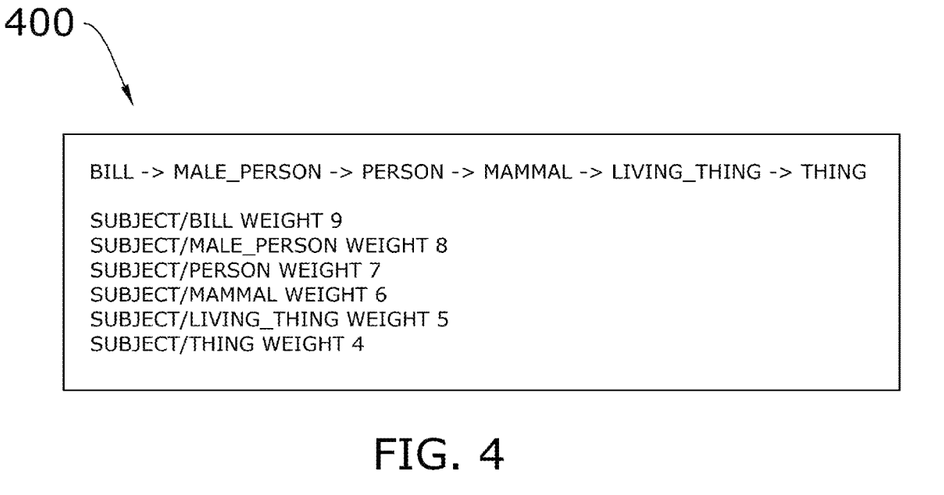
FIG. 4 conceptually illustrates a listing of subject sentence parts including weights in some embodiments.

By way of example, FIG. 4 conceptually illustrates a listing of subject sentence parts including weights (hereinafter also referred to as "listing of subject sentence parts and weights 400"). To make sense of this listing of subject sentence parts and weights 400, it is important to know that the computer understanding state machine receives many inputs at once. Consider the sentence "Bill goes home." The computer understanding state machine of the present specification receives all the parser inputs: subject/Bill, verb/go, and object/home. Although the actual input word "goes" is provided, it is converted to "go", which is the base verb of "goes", resulting in parser input "verb/go" for the input word "goes". In addition, the computer understanding state machine of some embodiments receives abstractions of all of the sentence parts. The listing of subject sentence parts and weights 400 in FIG. 4 only demonstrates sentence parts for subject/Bill. Specifically, subject/Bill, subject/male_person, subject/person, subject/mammal, subject/living_thing, subject/thing. However, the computer understanding state machine would actually receive subject/Bill, subject/male_person, subject/person, subject/mammal, subject/living_thing, subject/thing, verb/go, object/home, object/building, object/thing. All of these inputs are used to find a computer understanding state machine state that matches the inputs. Each computer understanding state machine state in the computer understanding state machine has a list of inputs that must occur for the computer understanding state machine state to activate. All items in the list must be input for the computer understanding state machine state to activate. The input list for the computer understanding state machine state "person goes home" has the inputs subject/person, verb/go, and object/home. The computer understanding state machine state "person goes home" activates because all three items in the input list are present when the sentence, "Bill goes home," is input, assuming this computer understanding state machine state has the highest weight. Determining the highest weight is described in the next paragraph, by reference to FIG. 5, which provides another example of a listing of an abstraction of all sentence parts. In any event, is important to note that the computer understanding state machine state "person goes home" is used to understand any person going home. This saves memory space because there is no need to store a separate computer understanding state machine state for every possible person going home. This also saves runtime processing because there are less items to search for a match.

Figure 5:
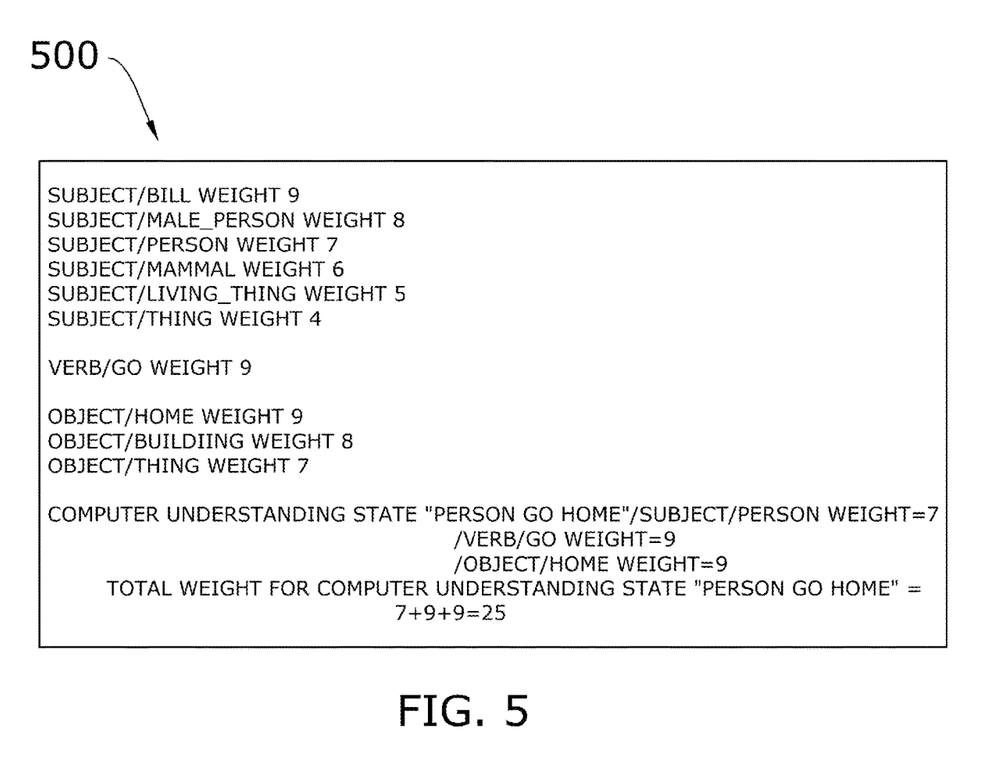
FIG. 5 conceptually illustrates a listing in some embodiments of abstractions of all sentence parts for the sentence "Bill goes home."

Referring now to FIG. 5, a listing of an abstraction of all sentence parts for a sentence 500 is shown. The sentence in this is example is "Bill goes home." As shown in this figure, the abstractions of the sentence parts in the listing of the abstraction of all sentence parts for the sentence 500 also include weights. This is used to find the best fitting computer understanding state machine state. The weight decreases by one ("1") for each level of abstraction. For example, subject/Bill is weight nine ("9"), subject/male_person is weight eight ("8"), subject/person is weight seven ("7"), subject/mammal is weight six ("6"), subject/living_thing is weight five ("5"), and subject/thing is weight four ("4"). Verb/go is weight nine ("9"). Object/home is weight nine ("9"), object/building is weight eight ("8"), object/thing is weight seven ("7"). All of the weights of the inputs to the computer understanding state machine are summed and the highest total for computer understanding state machine states where all inputs match the computer understanding state machine state is selected. Referring again to the computer understanding state machine states "person go home" and "person go thing". When the sentence "Bill goes home" is input, the weight of the computer understanding state machine state "person goes home" is subject/person which is weight seven ("7"), verb/go is weight nine ("9"), and object/home is weight nine ("9"). The weights are summed for a total of twenty-five ("7+9+9=25"), as described above. The computer understanding state machine state "person go thing" is subject/person which is weight seven ("7"), verb/go is weight nine ("9"), and object/thing is weight seven ("7") for a total of twenty-three ("7+9+7=23"). Thus, the computer understanding state machine state "person go home" with weight twenty-five ("25") is selected over "person go thing" which has weight twenty-three ("23"). Once again, this is the result of the highest weight state twenty-five ("25") with all sentence part inputs and abstractions matching the input list of the computer understanding state machine state as selected. Verb abstraction is not shown in this example but if the sentence being parsed were "Bill runs home", the verb "run" would abstract to the verb "go".

Figure 6:
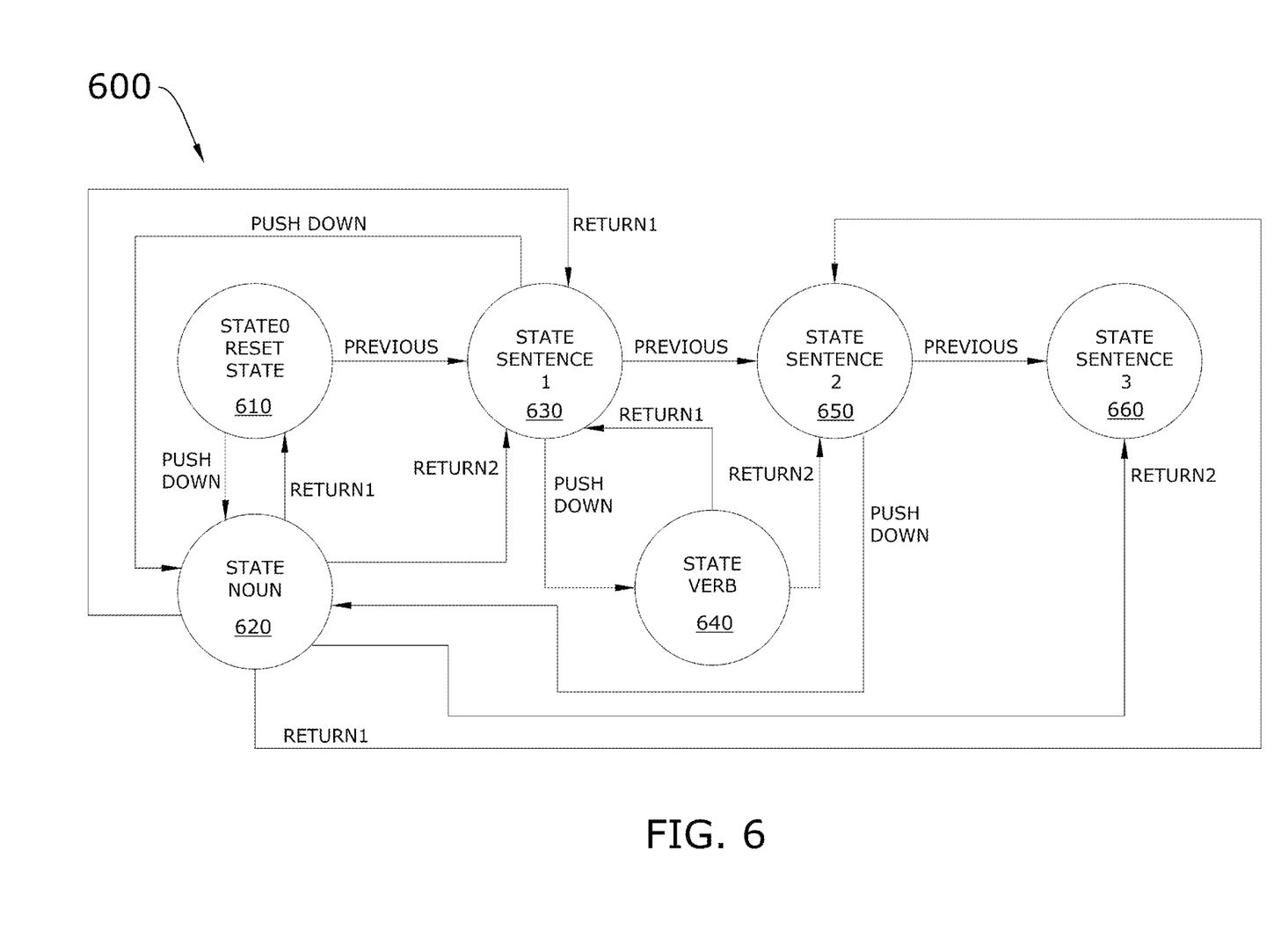
FIG. 6 conceptually illustrates states of the Woods state machine when parsing the sentence "Bill goes home."
Figure 7:
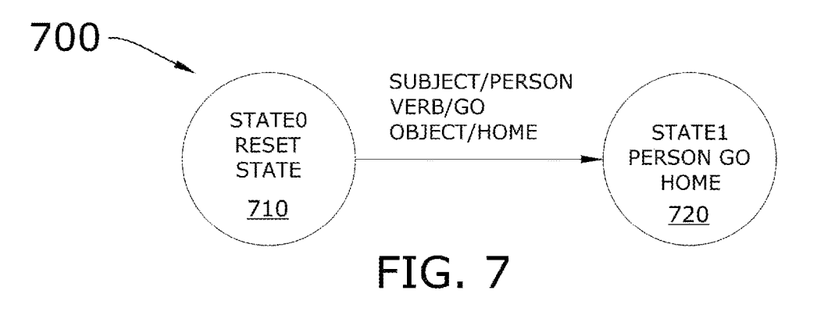
FIG. 7 conceptually illustrates a computer understanding state machine in some embodiments understanding the sentence "Bill goes home."

By way of example, FIG. 7 conceptually illustrates a computer understanding state machine 700 for "person go home". The computer understanding state machine 700 shown in this figure is able to understand the sentence "Bill went home" or other sentences conforming to "person go home". As shown in this figure, a first active state 720 of the computer understanding state machine 700 is activating ("State 1" activates by input "person go home"). The computer understanding state machine 700 starts in an initial reset state 710 (or "Reset State 0") and when the sentence, "Bill goes home," is input, it is parsed and the parsed sentence is input to the computer understanding state machine 700: subject/person, verb/go, object/home (along with the weights of each input, which are not shown in this figure). If the computer understanding state machine 700 calculates the state "person go home" as having the highest total weight, it is selected, and the transition to the first active state 720 occurs. In this way, single sentences are understood. The understanding of sequences of sentences is described further below, by reference to FIGS. 6, 8, and 9.

In some embodiments, the computer understanding state machine states are states in a computer understanding state machine to allow understanding sequences of sentences. For example, the sentences "Bill is hungry," followed by "Bill eats food." The sentence, "Bill is hungry," activates the computer understanding state machine state "person is hungry". This computer understanding state machine state is a state in the computer understanding state machine. Just like the parser state machine moves from state to state based on the word types, the computer understanding state machine state machine moves from computer understanding state machine state to computer understanding state machine state based on the sequence of sentences. The computer understanding state machine state "person be hungry" is linked to the computer understanding state machine state "person be hungry, eats food" and activates when the sentence, "Bill is hungry," is followed by the sentence "Bill eats food." Note that the second sentence could be any food, such as "Bill eats popcorn". The word "popcorn" abstracts to food which is used to activate the computer understanding state machine state "person be hungry, eats". Note that the base verb of "is" is "be".

Figure 8:
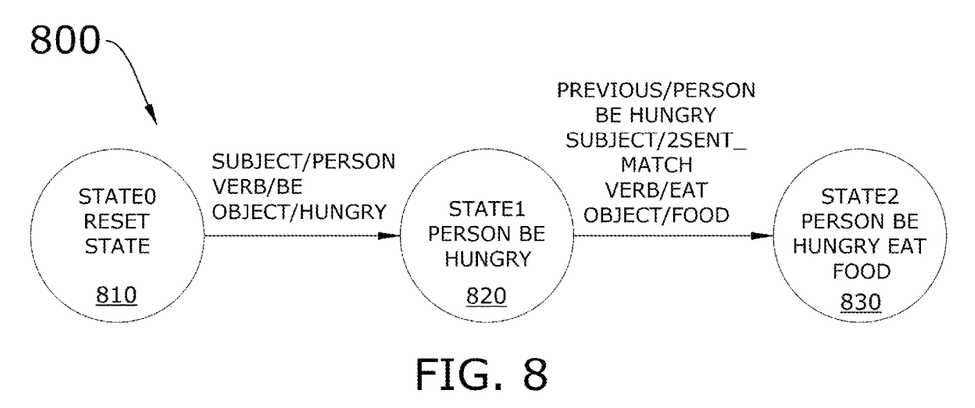
FIG. 8 conceptually illustrates a computer understanding state machine in some embodiments understanding a sequence of sentences including the sentence, "Bill is hungry," followed by the sentence, "Bill eats food."

By way of example, FIG. 8 conceptually illustrates a computer understanding state machine that understands a sequence of sentences 800. The sequence of sentences in this example is "person be hungry" and "person eat food", which would allow for input of the sentence, "Bill is hungry," followed by the sentence, "Bill eats food." In this figure, the computer understanding state machine that understands a sequence of sentences 800 starts at the reset state 810 (also referred to as "State 0" or "Reset State 0"). When the sentence "Bill is hungry" is input, the parser converts this sentence to the computer understanding state machine inputs: subject/person, verb/be, and object hungry. This will activate the first active state 820 for "person be hungry" (also referred to as "State 1" or "person be hungry state") if this is the highest weight state and is activated by all of the inputs in "Bill is hungry", to match the input list for the computer understanding state machine 800, and thereby cause the computer understanding state machine that understands a sequence of sentences 800 to transition to the first active state 820 for "person be hungry". The next sentence "Bill eats food" will activate a second state 830 for "person be hungry, eat food" (also referred to as "State 2" or "person be hungry eat food state") if this is the highest weighted state, and because all of the parsed inputs from the sentence match the state input list for the computer understanding state machine 800. In this way, the computer understanding state machine that understands a sequence of sentences 800 is able to understand the sequence of sentences "Bill is hungry" followed by "Bill eats food." By "understanding", it is meant that the action associated with the second state 830 for "person is hungry, eats food" learns the cognitive link "Bill/hunger_level/hungry then eats". Cognitive links are described in U.S. Pat. No. 7,370,042. While this example demonstrates how the computer understanding state machine that understands a sequence of sentences 800 is able to understand a sequence of two sentences, it is noted that the computer understanding state machine that understands a sequence of sentences 800 and similar computer understanding state machines are able to understand more than two sentences which a user or process may input. Specifically, the computer understanding state machine of some embodiments is able to move on to other computer understanding state machine states, which allows deeper and greater understanding of sequences of sentences with an unlimited number of sentences.

Also, the sequence of sentences includes "Bill is hungry" and "Jim eats food" is input, with "Bill is hungry" followed by "Jim eats food," then the computer understanding state machine state "person be hungry, eat food" does not activate because the subject "Bill" and "Jim" in each sentence is different, even though both "Bill" and "Jim" are of type "person" (e.g., "person be hungry" for "Bill is hungry" and "person eat food" for "Jim eats food"). Instead, the computer understanding state machine state input "subject/2 sentence match" will only activate if both sentences have the same subject.

In some embodiments, the computer understanding state machine state transitions can be hierarchical. The Woods state machine uses the same "noun" state for any noun, whether subject, object, object of a preposition, and so on. The computer understanding state machine state machine uses the same computer understanding state machine states in a similar manner. For example, the sentence "Bill went to the movies," when followed by the sentence "Bill bought a ticket," uses the same "person buy ticket" that is used whenever a person buys a ticket. For example, the same "person buy ticket" computer understanding state machine state activates for input of a person buys a ticket at the movies, or if a person buys a ticket at the airport, at the amusement park, at the train station, and so on wherever a person buys a ticket.

Also, the selected computer understanding state machine state has associated actions which are activated when the computer understanding state machine state is activated. As noted above, these actions are similar to the action associated with parser states that learn sentence parts such as subject or object when the appropriate parser states activate. For example, with the sentence "Bill goes home," the action associated with the parser state "sentence 1" may learn the sentence part subject/Bill, while a state "sentence 3" may learn object/home. With the computer understanding state machine state "person run home," the action may learn the location of Bill is home (Bill/location/home). In other words, the understanding of a sentence is the activation of the action associated with the computer understanding state machine state. This is described further, by reference to FIG. 6.

Specifically, FIG. 6 conceptually illustrates states of the Woods state machine 600 (also referred to as a "hierarchical state machine 600") when parsing the sentence "Bill goes home." In this figure, the hierarchical use of the state "noun" is shown, and referred to here as state noun 620. Consider the sentence "Bill goes home." Starting at a reset state 610 (also referred to as "State 0" or "Reset State 0"), when the noun Bill is input, the state machine 600 pushes down to state noun 620. This state noun 620 is reused whenever a noun is input, which can be the subject of a sentence, the object of a sentence, or other sentence noun parts. This reuse of a state (at state noun 620) makes this state machine a hierarchical state machine 600. After the noun "Bill" is input, the next word "went" is input, which is a verb. Since there is no "next" state from which to transition from state noun 620, the hierarchical state machine 600 returns to the reset state 610 with "return1" then moves to a first sentence state 630 (also referred to as "State Sentence 1") with "return2". The "previous" indicators between different states shown in FIG. 6 signifies that the previous state is active. Whenever there is no next state at a level of the hierarchical state machine 600, a return to the next higher level occurs. This is similar to a subroutine in a computer program which returns to the calling line in a program when the subroutine is finished. The action at the first sentence state 630 is to learn subject/Bill. From first sentence state 630, the hierarchical state machine 600 pushes down to state verb 640 when the verb "goes," from the sentence "Bill goes home," is input. When the word "home" is input, there is no next state for the state verb 640, so the hierarchical state machine 600 returns to a second sentence state 650 (also referred to as "State Sentence 2"), which learns the sentence part verb/go. When the word "home" is next input, the hierarchical state machine 600 moves to state noun 620. This is the same state noun 620 that was used to understand "Bill". This noun state (state noun 620) is used by the hierarchical state machine 600 whenever a noun occurs. The next input is the period (".") at the end of the sentence "Bill goes home." This moves the hierarchical state machine 600 from the state noun 620 to a third sentence state 660 (also referred to as "State Sentence 3") which learns the sentence part object/ home. Please note that state noun 620 returns to the third sentence state 660 (i.e., "State Sentence 3") in this case, which is the most recent "push_down" state. Previously, state noun 620 returned to the reset state 610, which was, at that previous time, the most recent "push_down" state.

Thus, FIG. 6 shows the states of the hierarchical state machine 600 parser used to process the sentence "Bill goes home." The parser for the hierarchical state machine 600 has many more states that are used to process more complicated noun phrases and verb phrases. For example, the sentence, "The very tall man goes home," uses a separate parser state to process the article "the", uses a separate parser state to process the intensifier "very", and uses a separate parser state to process the adjective "tall". These states are not shown in FIG. 6, but they are in the parser for the hierarchical state machine 600 to be used when needed. The parser also has states to process adverbs such as "quickly" and intensifiers such as "very". All of these additional parser states are not shown in the hierarchical state machine 600 demonstrated in FIG. 6 for purposes of readability of this figure.

The computer understanding state machine described in this specification is also a hierarchical state machine that is similar to the Woods state machine. However, instead of processing parts of sentences (as is done by the Woods state machine), the computer understanding state machine of the preferred embodiment processes sequences of sentences. As a hierarchical state machine, the computer understanding state machine reuses states in different situations. For example, when going to the movies and buying a ticket, the same buying a ticket computer understanding state machine states can be used in other situations, such as going to the carnival, going to the train station, or going to the race track. This is further described below, by reference to FIG. 9.

Figure 9:
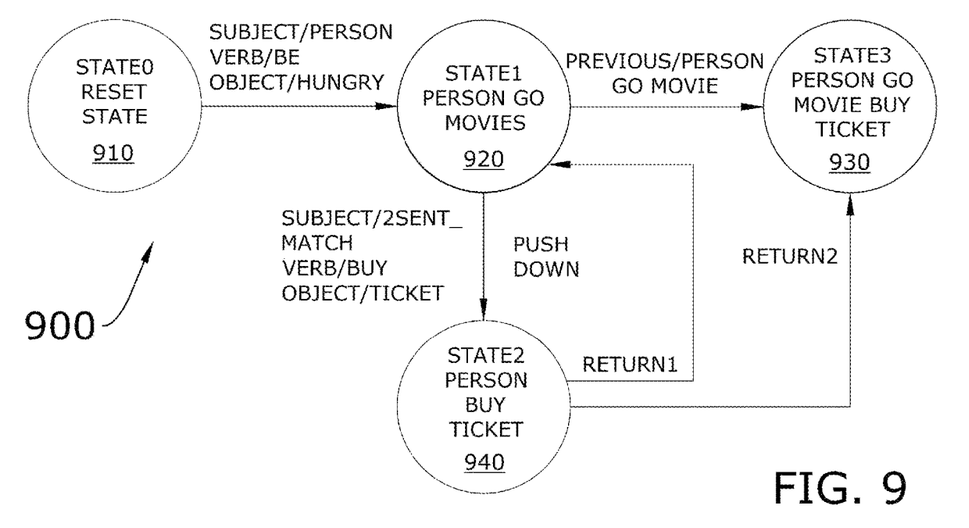
FIG. 9 conceptually illustrates hierarchical links of a computer understanding state machine in some embodiments.

By way of example, FIG. 9 conceptually illustrates hierarchical links of a computer understanding state machine 900. As shown in this figure, the computer understanding state machine starts in a reset state 910 (also referred to as "State 0" or "Reset State 0"). If the sentence "Bill went to the movies" is input, the computer understanding state machine 900 transitions to a first active state 920 (also referred to as "State 1", "state person go movies", or "person go movies state"), which is activating if it is the highest weight and when all inputs match the sentence parts of the input sentence. If the next sentence is "Bill bought a ticket", the computer understanding state machine 900 pushes down to the second active state 940 (also referred to as "State 2" or in general as "buying a ticket" state). When done buying a ticket, the computer understanding state machine 900 returns to the first active state 920 to transition to a third active state 930 (also referred to as "State 3" or in combination as "person go movie buy ticket" state). In this way the computer understanding state machine 900 understands going to the movies and buying a ticket.

In some embodiments, the computer understanding state machine also includes the abstraction of computer understanding state machine states similar to the way sentence parts are abstracted. For example, the computer understanding state machine state "person run home" abstracts to "person run thing," and "person go," and "person verb," and "thing verb". All of these can be used to transition to other computer understanding state machine states, with the highest weight transition being selected.

The above-described embodiments of the computer understanding state machine, the computer understanding state machine states, and the method are presented for purposes of illustration and not of limitation. Also, many of the above-described computer understanding state machine features and functions are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, reference to the implementation of software processes is also mentioned in more common or casual terminology, and terms such as "software", "application", "app", and "mobile app" (referred to below as "software") are meant to include firmware residing in read-only memory or applications stored in magnetic storage, which can be read into memory for processing by a processor, such as the processor of a mobile computing device or a mobile communication device, such as a smartphone, a hand-held computing device, or a tablet computing device (referred to simply as a "mobile device"), or the processor of a traditional computing device, such as a server computer, a desktop computer, or a laptop computer (referred to simply as a "computer"). Also, in some embodiments, multiple computer understanding state machine software implementations can be implemented as sub-parts of a larger program while remaining distinct software implementations of computer understanding state machines. In some embodiments, multiple computer understanding state machine software inventions can also be implemented as separate programs. Finally, any combination of separate programs that together implement a computer understanding state machine described here is within the scope of the invention. In some embodiments, the computer understanding state machine software programs, when installed to operate on one or more electronic systems, define one or more specific machine implementations of one or more computer understanding state machine inventions which execute and perform the operations of the computer understanding state machine software programs.

Figure 10:
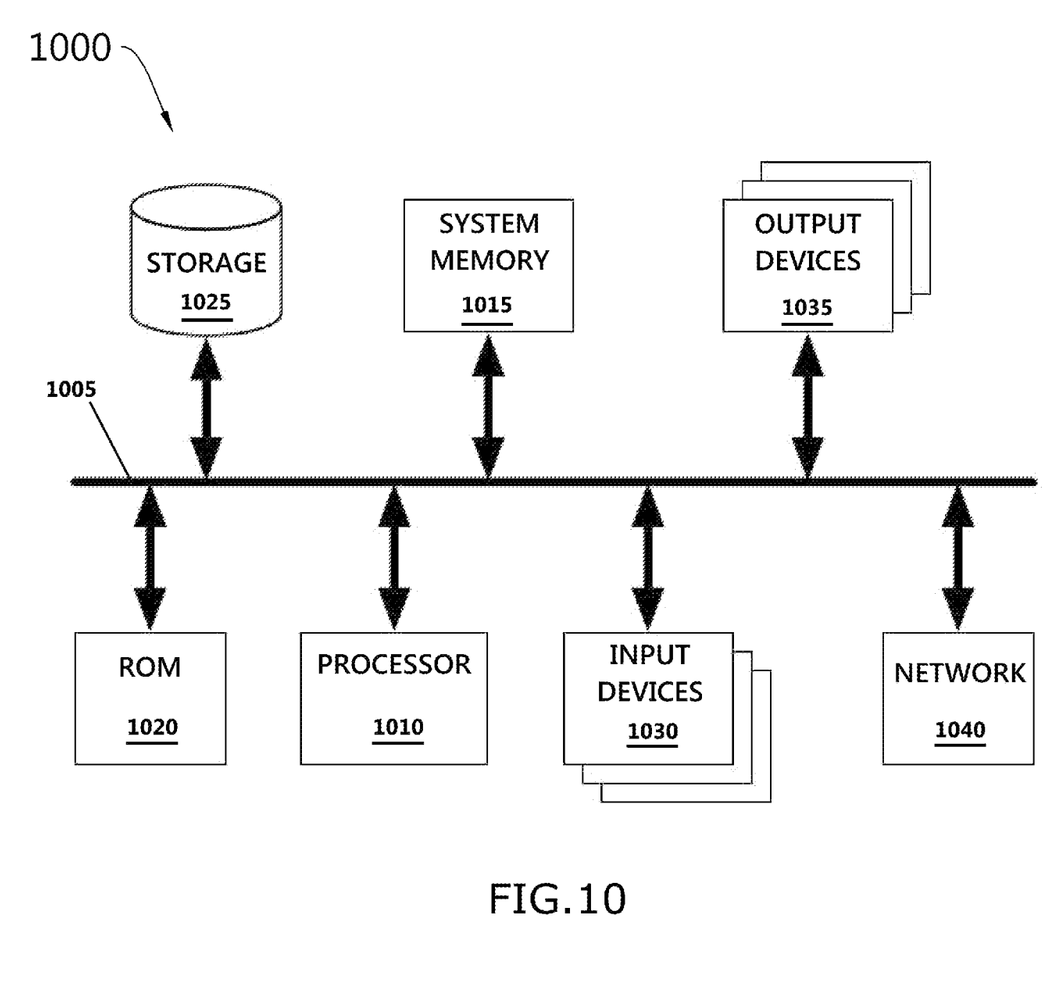
FIG. 10 conceptually illustrates an electronic system with which some embodiments of the invention are implemented.

FIG. 10 conceptually illustrates an electronic system 1000 with which some embodiments of the computer understanding state machine are implemented. The electronic system 1000 may be a computer, mobile device, tablet computing device, or any other sort of electronic device. Such an electronic system includes various types of computer readable media and interfaces for various other types of computer readable media. Electronic system 1000 includes a bus 1005, processing unit(s) 1010, a system memory 1015, a read-only memory 1020, a permanent storage device 1025, input devices 1030, output devices 1035, and a network 1040.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1020, the system memory 1015, and the permanent storage device 1025.

From these various memory units, the processing unit(s) 1010 retrieves instructions to execute and data to process in order to execute the transitions and state actions of the computer understanding state machine. The processing unit(s) may be a single processor or a multi-core processor in different embodiments of the computer understanding state machine.

The read-only-memory (ROM) 1020 stores static data and instructions that are needed by the processing unit(s) 1010 and other modules of the electronic system. The permanent storage device 1025, on the other hand, is a read-and-write memory device. This device is a non-volatile memory unit that stores instructions and data even when the electronic system 1000 is off. Some embodiments of the computer understanding state machine use a mass-storage device (such as a magnetic or optical disk and its corresponding disk drive) as the permanent storage device 1025.

Other embodiments of the computer understanding state machine use a removable storage device (such as a flash drive) as the permanent storage device 1025. Like the permanent storage device 1025, the system memory 1015 is a read-and-write memory device. However, unlike storage device 1025, the system memory 1015 is a volatile read-and-write memory, such as a random access memory. The system memory 1015 stores some of the instructions and data that the processor needs at runtime. In some embodiments, the computer understanding state machine's programmatic (software) processes are stored in the system memory 1015, the permanent storage device 1025, and/or the read-only memory 1020. For example, the various memory units include instructions for processing transitions between different states of the computer understanding state machine, performing actions commensurate with any active state of the computer understanding state machine, or perform logic operations to determine states of the computer understanding state machine based on input provided to the computer understanding state machine, and other operations in accordance with various embodiments of the computer understanding state machine. From these various memory units, the processing unit(s) 1010 retrieves instructions to execute and data to process in order to execute the processes of the computer understanding state machine in some embodiments.

The bus 1005 also connects to the input and output devices 1030 and 1035. The input devices enable the user to communicate information and select commands to the electronic system. The input devices 1030 include alphanumeric keyboards and pointing devices (also called "cursor control devices"). The output devices 1035 display images and provide information generated by the electronic system 1000. The output devices 1035 include display devices, such as liquid crystal displays (LCD) and organic light emitting diode (OLED) displays, and may include other output devices, such as traditional printers, 3D printers, etc. Some embodiments of the computer understanding state machine are implemented as software that involves human user input via touch gestures (e.g., a finger) or stylus input, including devices such as touchscreen displays, which function as both input and output devices.

Finally, as shown in FIG. 10, bus 1005 also couples electronic system 1000 to a network 1040 through a network adapter (not shown). In this manner, the electronic system can be a part of a network of computers (such as a local area network ("LAN"), a wide area network ("WAN"), or an intranet), or a network of networks (such as the Internet). Any or all components of electronic system 1000 may be used in conjunction with the invention.

These functions, as described above, can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks. Some embodiments include electronic components, such as microprocessors, storage and memory that store computer program instructions in a machine-readable or computer-readable medium (alternatively referred to as computer-readable storage media, machine-readable media, or machine-readable storage media). The computer-readable media may store a computer program (e.g., software implementation of the computer understanding state machine) that is executable by at least one processing unit and includes sets of instructions for performing various operations of the computer understanding state machine. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

I claim:

1. A method for processing natural language sentences comprising:
    receiving input into a computer understanding state machine, said input comprising parsed sentence parts and abstractions of the parsed sentence parts with weights of the abstractions decreasing with each level of abstraction;
    finding a best fitting computer understanding state machine state for the received input in the computer understanding state machine; and
    activating the best fitting computer understanding state machine state when all computer understanding state machine state list inputs match the parsed sentence parts input to the computer understanding state machine.

2. The method for processing natural language sentences of claim 1, wherein a sequence of sentences is processed by transition of states associated with the sentence parts of each sentence and previous states of the computer understanding state machine.

* * * * *